US012634975B2

(12) United States Patent
Yang

(10) Patent No.: US 12,634,975 B2
(45) Date of Patent: May 19, 2026

(54) ACTIVATED RESOURCE SWITCHING METHOD, COMMUNICATION DEVICE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 423 days.

(21) Appl. No.: 18/013,341

(22) PCT Filed: Jul. 14, 2020

(86) PCT No.: PCT/CN2020/101921
§ 371 (c)(1),
(2) Date: Dec. 28, 2022

(87) PCT Pub. No.: WO2022/011557
PCT Pub. Date: Jan. 20, 2022

(65) Prior Publication Data
US 2023/0254881 A1 Aug. 10, 2023

(51) Int. Cl.
*H04W 72/23* (2023.01)
*H04W 72/231* (2023.01)
*H04W 72/53* (2023.01)
(52) U.S. Cl.
CPC ......... *H04W 72/53* (2023.01); *H04W 72/231* (2023.01)
(58) Field of Classification Search
CPC ... H04W 72/23; H04W 72/53; H04W 72/231; H04W 52/146
See application file for complete search history.

(56) References Cited

U.S. PATENT DOCUMENTS

| | | | |
|---|---|---|---|
| 2019/0044811 A1* | 2/2019 | Miao | H04L 5/00 |
| 2019/0104543 A1* | 4/2019 | Park | H04W 74/006 |
| 2019/0132862 A1* | 5/2019 | Jeon | H04L 5/0098 |
| 2019/0141546 A1* | 5/2019 | Zhou | H04L 5/001 |
| 2020/0120708 A1 | 4/2020 | Liu et al. | |
| 2021/0075579 A1* | 3/2021 | Liu | H04L 5/0098 |
| 2021/0105716 A1* | 4/2021 | Wu | H04L 41/0806 |
| 2021/0218620 A1* | 7/2021 | Yuan | H04W 56/0045 |

(Continued)

FOREIGN PATENT DOCUMENTS

| | | |
|---|---|---|
| CN | 110831170 A | 2/2020 |
| CN | 111107612 A | 5/2020 |

(Continued)

OTHER PUBLICATIONS

European Patent Application No. 20945551.8 Search and Opinion dated Mar. 18, 2024, 7 pages.

(Continued)

*Primary Examiner* — Andrew Lee
(74) *Attorney, Agent, or Firm* — Cozen O'Connor

(57) ABSTRACT

An activated resource switching method, performed by a User Equipment (UE) in a wireless communication network, includes: receiving an activation signal carrying a resource identifier; and in response to the resource identifier indicating a resource to be activated for the UE, activating a first resource based on a configuration of the resource to be activated containing the resource identifier, and deactivating an activated second resource.

16 Claims, 5 Drawing Sheets

(56)                    References Cited

U.S. PATENT DOCUMENTS

| | | | | |
|---|---|---|---|---|
| 2022/0232611 A1* | 7/2022 | Hakola | ............. | H04W 52/0229 |
| 2022/0338293 A1* | 10/2022 | Yu | ........................ | H04W 72/044 |
| 2023/0025873 A1* | 1/2023 | Jia | ..................... | H04W 74/0816 |

FOREIGN PATENT DOCUMENTS

| | | | |
|---|---|---|---|
| WO | WO 2019062837 A1 | 4/2019 | |
| WO | WO 2020020057 A1 | 1/2020 | |

OTHER PUBLICATIONS

PCT/CN2020/101921, English translation of International Search Report dated Apr. 2, 2021, 2 pages.
Indian Patent Application No. 202247077184, Office Action dated May 4, 2023, 7 pages.

* cited by examiner

Figures 4, 5:
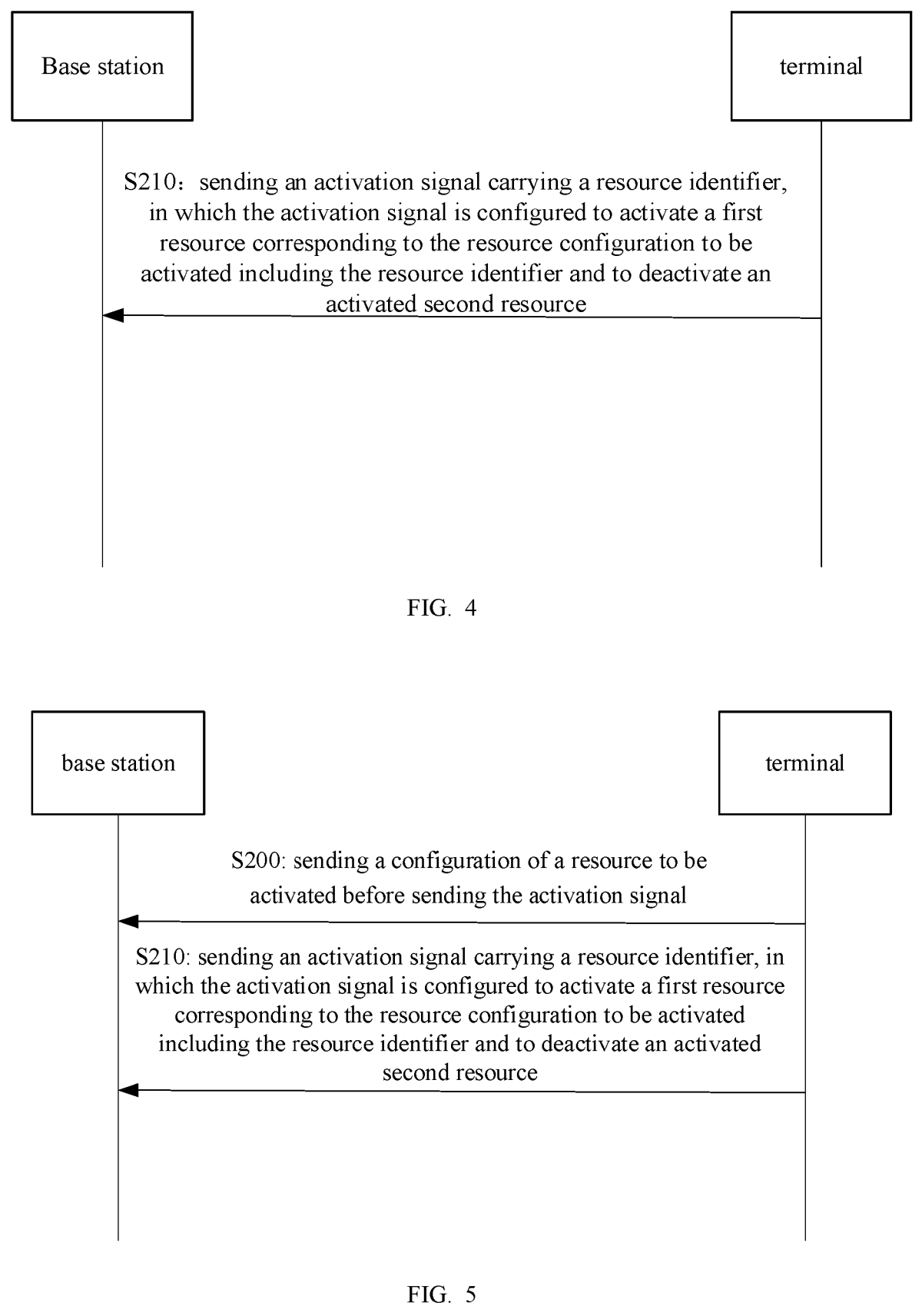

Base station                                                        terminal

S210：  sending an activation signal carrying a resource identifier,
in which the activation signal is configured to activate a first
resource corresponding to the resource configuration to be
activated including the resource identifier and to deactivate an
activated second resource

FIG. 4 base station                                                        terminal

S200: sending a configuration of a resource to be
activated before sending the activation signal S210: sending an activation signal carrying a resource identifier, in
which the activation signal is configured to activate a first resource
corresponding to the resource configuration to be activated
including the resource identifier and to deactivate an activated
second resource

FIG. 5 activated resource switching apparatus receiving module 110 activating module 120 activated resource switching apparatus sending module 210

ACTIVATED RESOURCE SWITCHING METHOD, COMMUNICATION DEVICE, AND STORAGE MEDIUM

CROSS-REFERENCE TO RELATED APPLICATION

This application is a national phase of International Application No. PCT/CN2020/101921, filed on Jul. 14, 2020, the entire content of which is incorporated herein by reference.

TECHNICAL FIELD

The disclosure relates to the field of wireless communication technology but is not limited to the field of wireless communication technology, and provides an activated resource switching method, an activated resource switching apparatus, a communication device and a storage medium.

BACKGROUND

A wireless resource in a wireless communication network may be used by different terminal devices at different time points. For every individual terminal, the resource for the terminal may be switched between activated and deactivated states.

In the related art, the switching of the resource may lead to conflict between resources or resource waste.

SUMMARY

According to a first aspect of the disclosure, an activated resource switching method, applied in a User Equipment (UE), is provided. The method includes:

receiving an activation signal carrying a resource identifier; and in response to the resource identifier indicating a resource to be activated for the UE, activating a first resource based on a configuration of the resource to be activated containing the resource identifier, and deactivating an activated second resource.

According to a second aspect of the disclosure, an activated resource switching method, applied in a control node, is provided.

The method includes:

sending an activation signal carrying a resource identifier, in which the activation signal is configured to activate a first resource corresponding to the resource identifier within a UE and to deactivate an activated second resource within the UE.

According to a third aspect of the disclosure, a communication device including a processor, a transceiver, a memory and programs stored on the memory and executable by the processor is provided. When the programs are executed by the processor, the method of the first aspect of the disclosure or the method of the second aspect of the disclosure is implemented.

According to a fourth aspect of the disclosure, a computer storage medium storing executable programs is provided. When the executable programs are executed by a processor, the method of the first aspect of the disclosure or the method of the second aspect of the disclosure is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 4 is a flowchart of an activated resource switching method according to an exemplary embodiment.

FIG. 5 is a flowchart of another activated resource switching method according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information. Similarly, the second information may also be referred to as the first information. Depending on the context, the term "if" as used herein can be interpreted as "when", "while" or "in response to determining".

Figure 1:
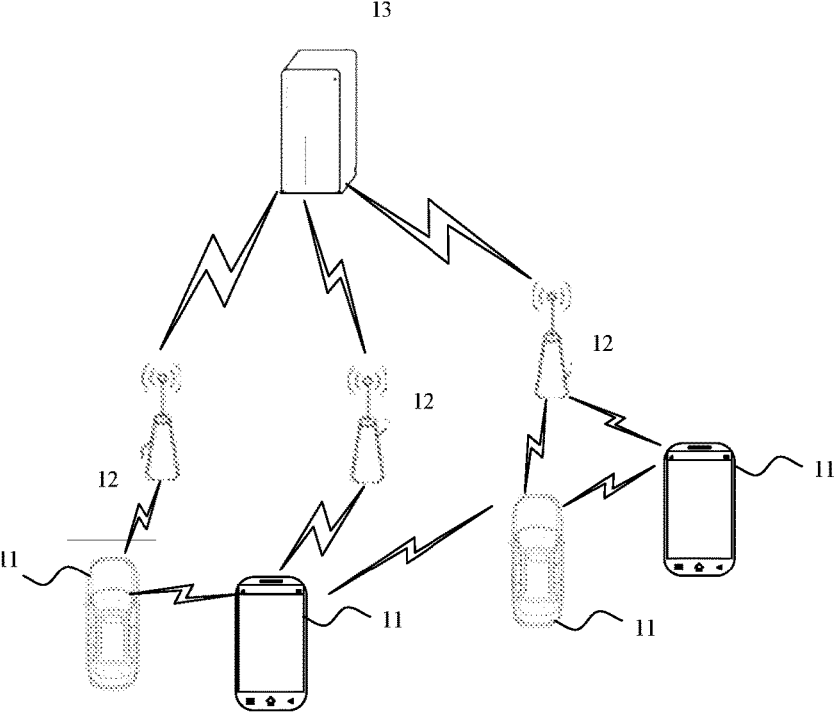
FIG. 1 is a schematic diagram of a wireless communication system according to an exemplary embodiment.

FIG. 1 is a schematic diagram of a wireless communication system according to an exemplary embodiment. As shown in FIG. 1, the wireless communication system is a communication system based on the cellular mobile communication technology. The wireless communication system may include: a plurality of UEs 11 and a plurality of base stations 12.

The UE 11 may be a device that provides voice and/or data connectivity to a user. The UE 11 may communicate with one or more core networks via a Radio Access Network (RAN). The UE 11 may be an Internet of Things (IoT) UE, such as a sensor device, a mobile phone (or "cellular" phone) and a computer with the IoT UE. The UE 11 may be a fixed, portable, pocket, hand-held, built-in computer or a vehicle-mounted device, such as, a Station (STA), a subscriber unit, a subscriber station, a mobile station, a mobile, a remote station, an access point, a remote terminal, an access terminal, a user terminal, a user agent, a user device, or a UE. Alternatively, the UE 11 may also be an Unmanned Aerial Vehicle (UAV) device. Alternatively, the UE 11 may also be a vehicle-mounted device, such as, an Engine Control Unit (ECU) with a wireless communication function, and a wireless communication device connected to the ECU. Alternatively, the UE 11 may also be a roadside device, such as, a street light, a signal light, or other roadside devices with a wireless communication function.

The base station 12 may be a network-side device in the wireless communication system. The wireless communication system may be the 4th Generation (4G) mobile communication system, also known as a Long Term Evolution (LTE) system. Alternatively, the wireless communication system may also be the 5th Generation (5G) mobile communication system, also known as a New Radio (NR) system or a 5G NR system. Alternatively, the wireless communication system may also be a next-generation system of the 5G system. The access network in the 5G system may be called a New Generation-Radio Access Network (NG-RAN), or a Machine Type Communication (MTC) system.

The base station 12 may be an evolved base station (eNB) in the 4G system. Alternatively, the base station 12 may also be a base station (gNB) that adopts a centralized distributed architecture in the 5G system. When the base station 12 adopts a centralized distributed architecture, it generally includes a Central Unit (CU) and at least two Distributed Units (DUs). The CU is provided with protocol stacks of a Packet Data Convergence Protocol (PDCP) layer, a Radio Link Control (RLC) layer, and a Media Access Control (MAC) layer. A physical (PHY) layer protocol stack is set in the DU, and the specific implementation manner of the base station 12 is not limited in this embodiment of the disclosure.

A wireless connection between the base station 12 and the UE 11 can be established through a radio interface. In different embodiments, the radio interface is a radio interface based on the 4G standard. Alternatively, the radio interface is a radio interface based on the 5G standard, for example, a NR. Alternatively, the radio interface may also be a radio interface based on a next generation of the 5G standard.

In some embodiments, an End to End (E2E) connection may also be established between the UEs 11, for example, scenes such as Vehicle to Vehicle (V2V) communication, Vehicle to Infrastructure (V2I) communication and Vehicle to Pedestrian (V2P) communication in Vehicle to everything (V2X) communication.

In some embodiments, the above wireless communication system may further include a network management device 13.

A plurality of the base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in this embodiment of the disclosure.

Figure 2:
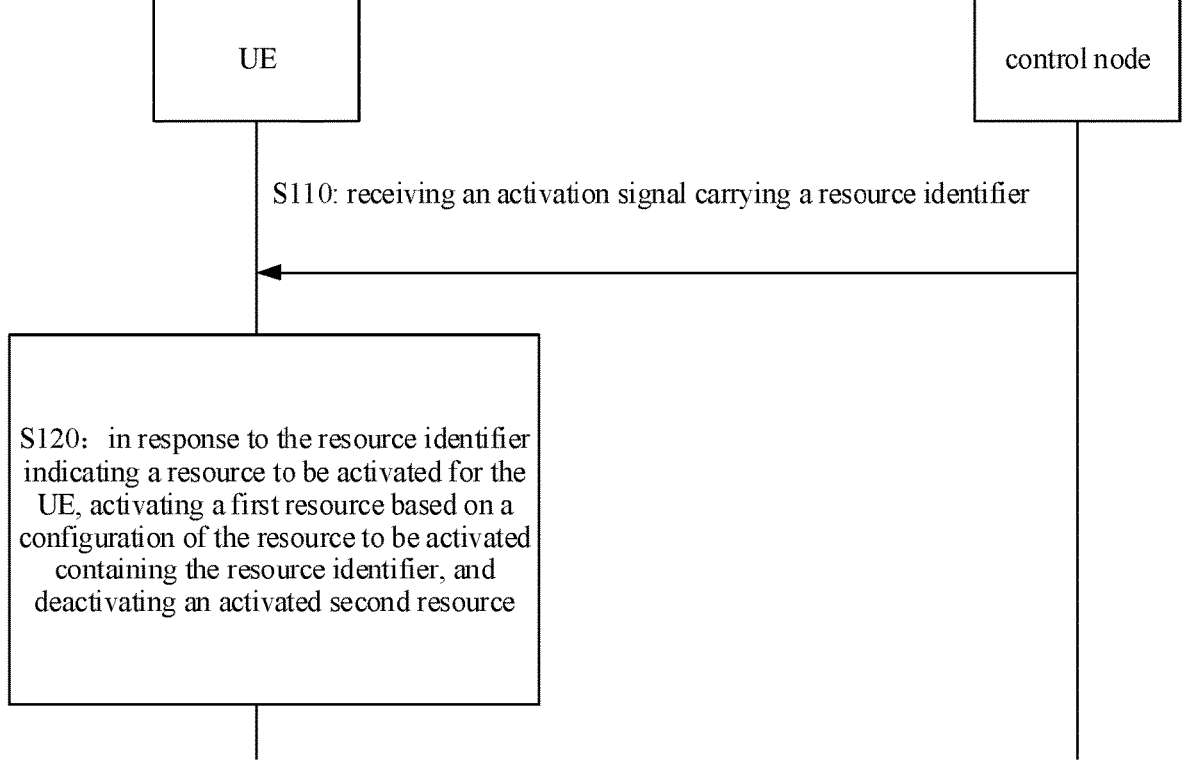
FIG. 2 is a flowchart of an activated resource switching method according to an exemplary embodiment.

As shown in FIG. 2, an activated resource switching method, applied in a UE, is provided. The method includes the following steps.

At step S110, an activation signal carrying a resource identifier is received.

At step S120, in response to the resource identifier indicating a resource to be activated for the UE, a first resource is activated based on a configuration of the resource to be activated containing the resource identifier, and an activated second resource is deactivated.

The terminal may be a variety of types of devices capable of transmitting data using the wireless resource. The terminal includes, but is not limited to: a mobile terminal and/or a fixed terminal.

The mobile terminal includes, but is not limited to: a portable mobile terminal, a vehicle-mounted terminal, and a smart device.

The portable mobile terminal includes, but is not limited to: a cell phone and/or a wearable device.

The smart device includes, but is not limited to: a smart home device and/or a smart office device.

The activation signal may be sent by a control node for performing resource scheduling or allocation.

The activation signal may be a unicast signal, a multicast signal, and/or a broadcast signal.

In the embodiment of the disclosure, the activation signal carries a resource identifier that indicates the wireless resource to be activated by the activation signal.

After receiving the activation signal, the terminal matches the resource identifier carried by the activation signal with the resource identifier contained in the configuration of the resource to be activated pre-assigned by the control node, and matches the resource identifier carried by the activation signal with the resource identifier contained in the activated resource identifier of the activated wireless resource for the terminal.

If the resource identifier carried by the received activation signal is the resource identifier contained in the configuration of the resource to be activated, the first resource is activated based on the configuration of the resource to be activated containing the resource identifier.

The terminal uses the activated first resource for transmitting data. The first resource may be any wireless resource for transmitting data. For example, the terminal may perform a short-range communication using the activated first resource. The short-range communication includes but is not limited to: Bluetooth communication, WiFi direct communication and sidelink communication.

The UE stores both the resource configuration of the resource to be activated assigned by the control node and a resource configuration of the activated resource within the UE. The resource configuration of the resource to be activated within the UE is referred to as the configuration of the resource to be activated in the embodiment. The resource configuration of the activated resource within the UE is referred to as the configuration of the activated resource in the embodiment.

After receiving the activation signal, the terminal also deactivates the currently activated second resource. Deactivating the second resource includes at least one of:

deleting a resource configuration of the second resource, i.e., deleting the configuration of the activated resource;

configuring a discard identifier for the configuration of the activated resource of the second resource; and removing the configuration of the activated resource from a storage area where the resource configuration of the activated resource is stored.

In some embodiments, activating the first resource includes:

configuring a resource configuration of the first resource (i.e., the configuration of the resource to be activated at the current moment) as the configuration of the activated resource.

For example, an identifier bit is set for indicating the first resource as a currently activated resource.

For example, the resource configuration of the first resource (i.e., the configuration of the resource to be activated at the current moment) is stored in the storage area where the resource configuration of the activated resource is stored.

In conclusion, in this embodiment, upon reception of the activation signal, if the UE determines that the activation signal carries the resource identifier of its own resource to be activated based on the resource identifier carried by the activation signal, then activates the first resource to be activated and deactivates the second resource that is currently activated simultaneously. In this way, after the above activation and deactivation operations, the first resource to be activated is activated, and the second resource that is currently activated is caused to enter a state to be activated (or a deactivated state), and thus the switching of the activated resource within the UE is realized. Compared with using different signals to control the activation and deactivation of resources, using the same activation signal to cause the UE to switch the activated resource can reduce the resource waste and resource usage confliction caused when the two resources are in the activated state at the same time and the problem that there is no resource available for the UE when the two resources are in the deactivated state at the same time, thereby optimizing the resource scheduling for the UE.

In an embodiment, the first resource and the second resource may be resources located within a noise reduction resource pool for a noise reduction service. The UE may be a noise reduction terminal. The noise reduction terminal generally includes: various audio devices. For example, an audio output device generally includes: a speaker, and an audio input device generally includes: a microphone.

For the noise reduction service, the environmental noise at the location of the audio output device is collected by the audio input device and transmitted to a network side using the wireless resource, the network side fits a noise reduction signal against the environmental noise according to the collected environmental noise and returns the noise reduction signal to a noise reduction terminal, and the audio output device of the noise reduction terminal superimposes the noise reduction signal and an audio signal to be output and outputs the superimposed signal. The above noise reduction signal can be an inverse noise whose phase is opposite to the environmental noise, and thus the noise reduction effect is achieved by superimposing the phases of the generated inverse noise and the environmental noise. Therefore, the noise reduction service requires highly on the transmission delay and the transmission reliability. When switching the activated resource for the terminal, if there is a time difference or overlap between the two switched resources, poor noise reduction effect or failure of the noise reduction service may occur. Therefore, the activation signal in the disclosure can activate the first resource and deactivate the second resource simultaneously, which reduces the resource waste, the resource confliction and the communication interruption caused by the time difference between the activated resources, optimizes the resource scheduling of the UE, and further optimizes the communication effect.

The noise reduction device may be various types of portable mobile terminals, or vehicle-mounted devices, such as, vehicle-mounted speakers and vehicle-mounted microphones in a vehicle system.

Figure 3:
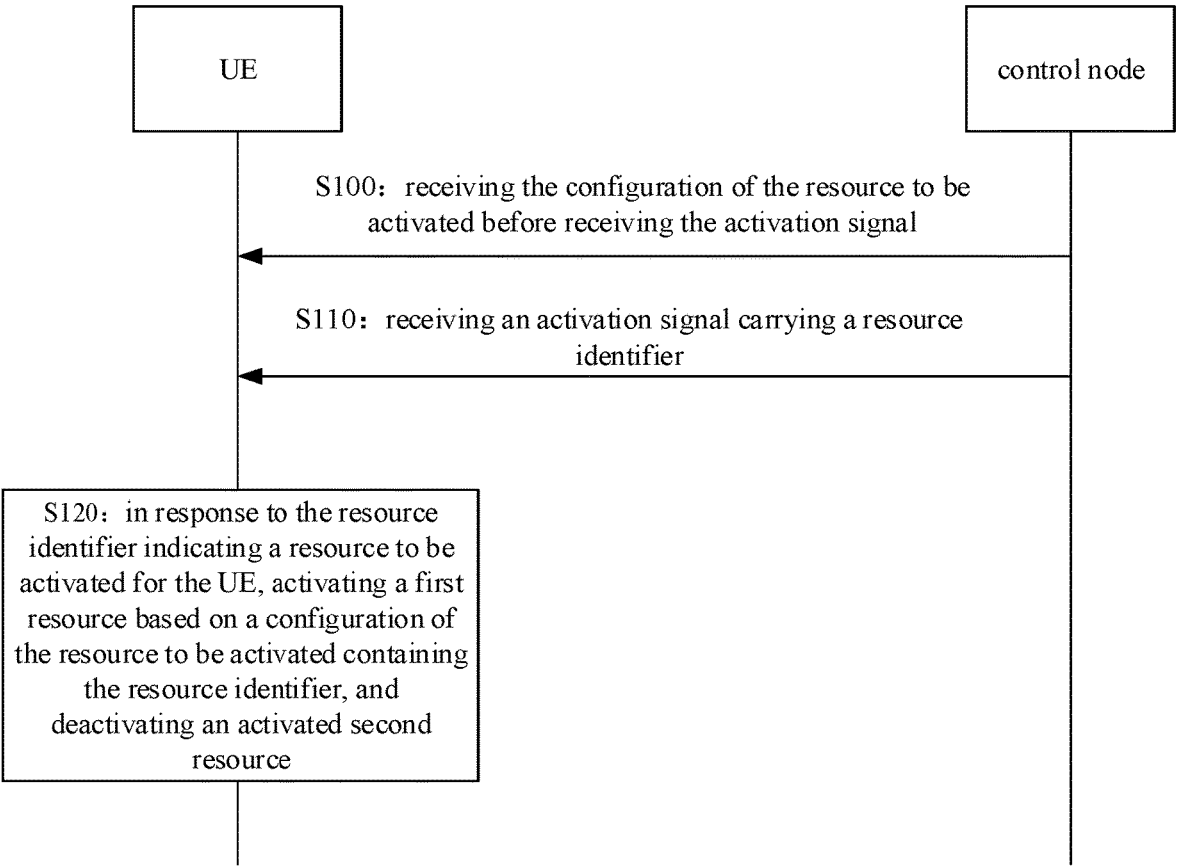
FIG. 3 is a flowchart of an activated resource switching method according to an exemplary embodiment.

In some embodiments, as shown in FIG. 3, the method further includes the following steps.

At step S100, the configuration of the resource to be activated is received before receiving the activation signal.

The configuration of the resource to be activated may be sent to the UE by the control node in advance, such that the UE receives the resource configuration of the first resource allocated to the UE by the control node (i.e., the configuration of the resource to be activated) before the activation signal is received.

If the configuration of the resource to be activated is received before the activation signal, that is, the control node transmits the configuration of the resource to be activated before the activation signal is transmitted, so that the control node needs to control the UE to transmit the activation signal when switching the activated resource, so as to control the UE to switch the activated resource in time. That is, once the UE receives the activation signal, and determines the activation signal is the activation signal triggering itself to activate the first resource according to a matching between the resource identifier carried by the activation signal and the resource identifier in the configuration of the resource to be activated, the UE can activate the first resource and deactivate the second resource.

In other embodiments, the activation signal may also carry activation time information which is used to indicate the time at which the UE activates the first resource, i.e., the time at which the activated resource is switched. If the activation signal carries the activation time information, the UE activates the first resource and deactivates the second resource according to an activation time indicated by the activation time information carried by the activation signal.

In other embodiments, the method further includes: sending the configuration of the resource to be activated of the first resource together with the activation signal; or, sending the configuration of the resource to be activated of the first resource after the activation signal. In conclusion, if the activation signal is received before the configuration of the resource to be activated, the UE stores the received activation signal and then activates the first resource and deactivates the second resource according to the configuration of the resource to be activated after the configuration of the resource to be activated is received.

In conclusion, a receiving time of the configuration of the resource to be activated is, but is not limited to, prior to a transmitting time of the activation signal.

In other embodiments, step S100 may include:

receiving a MAC control frame carrying the configuration of the resource to be activated;

or, receiving a Radio Resource Control (RRC) message carrying the configuration of the resource to be activated.

If the configuration of the resource to be activated is received via the MAC control frame or the RRC message, since both the RRC message and the MAC control frame can be unicast to the corresponding UEs, if the first resource is allocated to a UE, the UE can receive the corresponding configuration of the resource to be activated.

Since the flexibility for transmitting the configuration of the resource to be activated via the MAC control frame and the RRC message is high, the control node can flexibly schedule the UE to switch the activated resource according to current service transmission demands of each UE, a current communication load and a wireless environment.

In some embodiments, the activation signal is: a physical layer signal or a MAC (Control Element) CE.

The physical layer signal generally includes, but is not limited to, Downlink Control Information (DCI) or the MAC CE, which has a fast transmission speed.

In some embodiments, the configuration of the resource to be activated further includes: a resource parameter.

The configuration of the resource to be activated includes: a resource identifier that uniquely indicates a resource. The resource parameter is a further description of the resource attribute of the resource, such as, a resource location, and a periodicity of the resource.

Optionally, the resource parameter includes at least one of:

a resource location parameter, configured to indicate a resource location of a wireless resource;

a modulation encoding parameter, configured to indicate a modulation encoding mode for transmitting data using the wireless resource; and a power parameter, configured to indicate a transmission power for transmitting data using the wireless resource.

The resource location includes, but is not limited to: a frequency domain location and/or a time domain location.

The modulation encoding parameter is used at least to indicate a modulation encoding mode to be used for transmitting data using the first resource indicated by the configuration of the resource to be activated.

The power parameter is used at least to indicate the transmission power used by the UE to transmit data using the resource configured based on the configuration of the resource to be activated.

In conclusion, the configuration of the resource to be activated is a resource configuration. The resource parameters contained in the resource configuration can be used to indicate various resource parameters corresponding to a resource and related parameters for transmitting data using the resource.

As shown in FIG. 4, an activated resource switching method, applied in a control node, is provided in the embodiment. The method includes the following steps.

At step S210, an activation signal carrying a resource identifier is sent, in which the activation signal is configured to activate a first resource corresponding to the resource configuration to be activated including the resource identifier and to deactivate an activated second resource.

The control node includes, but is not limited to, a base station, a router, or a central control device within a system, for example, a central control device in a vehicle system.

The control node sends the activation signal to trigger the UE to activate a first resource to be activated and to deactivate an activated second resource of the same use or type as the first resource, to achieve the switching of the activated resource and to optimize the resource scheduling of the UE.

In an embodiment, step S210 includes:

sending a MAC control frame carrying the activation signal;

or, sending a RRC message carrying the activation signal.

In some embodiments, as shown in FIG. 5, the method further includes the following steps.

At step S200, a configuration of a resource to be activated is sent before sending the activation signal.

Since the configuration of the resource to be activated is sent before sending the activation signal, the UE will receive the configuration of the resource to be activated before receiving the activation signal, so that the transmitting time of the activation signal can be considered as a switching time when the UE switches the activated resource.

Certainly, in other embodiments, the activation signal may also carry the above activation time information, which explicitly indicates the switching time for switching the activated resource. The switching time can also be called the activation time.

In some embodiments, the activation signal is: a physical layer signal or a MAC CE.

In some embodiments, the configuration of the resource to be activated further includes:

a resource parameter.

For example, the resource parameter includes at least one of:

a resource location parameter, configured to indicate a resource location of a wireless resource;

a modulation encoding parameter, configured to indicate a modulation encoding mode for transmitting data using the wireless resource; and a power parameter, configured to indicate a transmission power for transmitting data using the wireless resource.

In some embodiments, if the first resource is a periodic resource or a semi-continuous scheduling resource, the resource parameter may further include: a period parameter indicating a period and/or offsets for adjusting start locations of different periods.

Figures 6, 7:
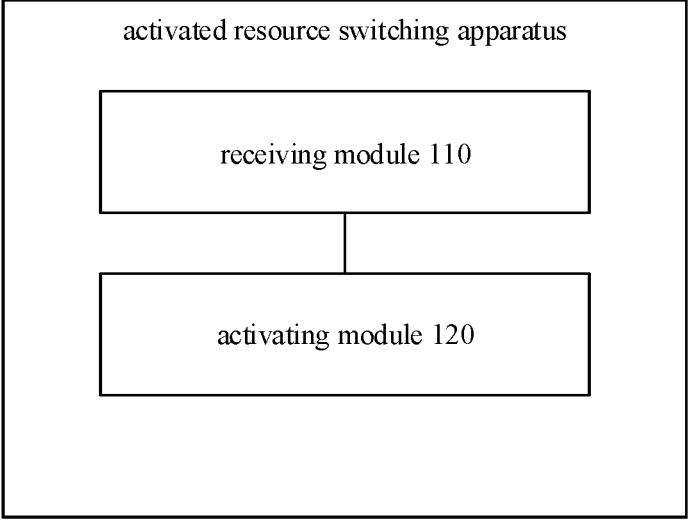
FIG. 6 is a schematic diagram of an activated resource switching apparatus according to an exemplary embodiment.
FIG. 7 is a schematic diagram of an activated resource switching apparatus according to an exemplary embodiment.

As shown in FIG. 6, an activated resource switching apparatus, applied in a UE, is provided in the embodiment. The apparatus includes: a receiving module 110 and an activating module 120.

The receiving module 110 is configured to receive an activation signal carrying a resource identifier.

The activating module 120 is configured to, in response to the resource identifier indicating a resource to be activated for the UE, activate a first resource based on a configuration of the resource to be activated containing the resource identifier, and deactivate an activated second resource.

In some embodiments, the receiving module 110 and the activating module 120 may be program modules. When the program modules are executed by a processor, the program modules can receive the activation signal, activate the first resource, and deactivate the second resource.

In another embodiment, the receiving module 110 and the activating module 120 may be combination modules of hardware and software. The module includes, but is not limited to, a variety of programmable arrays. The programmable array includes but is not limited to: a field programmable array or a complex programmable array.

In some embodiments, the receiving module 110 and the activating module 120 may be pure hardware modules. The module includes but is not limited to, a specific integrated circuit.

In some embodiments, the receiving module 110 is further configured to: receive the configuration of the resource to be activated before receiving the activation signal.

In some embodiments, the receiving module 110 is further configured to: receive a MAC control frame carrying the configuration of the resource to be activated; or, receive a RRC message carrying the configuration of the resource to be activated.

In some embodiments, the activation signal is: a physical layer signal or a MAC CE.

In some embodiments, the configuration of the resource to be activated further includes: a resource parameter.

In some embodiments, the resource parameter includes at least one of:

a resource location parameter, configured to indicate a resource location of a wireless resource;

a modulation encoding parameter, configured to indicate a modulation encoding mode for transmitting data using the wireless resource; and a power parameter, configured to indicate a transmission power for transmitting data using the wireless resource.

As shown in FIG. 7, an activated resource switching apparatus, applied in a control node, is provided in the embodiment. The apparatus includes: a sending module 210.

The sending module 210 is configured to send an activation signal carrying a resource identifier, in which the activation signal is configured to activate a first resource corresponding to the resource identifier within a UE and deactivate an activated second resource within the UE.

In some embodiments, the sending module 210 may be a program module. When the program module is executed by a processor, the program module can send the activation signal.

In another embodiment, the sending module 210 may be a combination module of hardware and software. The module includes, but is not limited to, a variety of programmable arrays. The programmable array includes but is not limited to: a field programmable array or a complex programmable array.

In some embodiments, the sending module 210 may be a pure hardware module. The module includes but is not limited to, a specific integrated circuit.

In some embodiments, the sending module 210 is further configured to: send a configuration of a resource to be activated before sending the activation signal.

In an embodiment, the sending module 210 is further configured to: send a MAC control frame carrying the configuration of the resource to be activated; or, send a RRC message carrying the configuration of the resource to be activated.

In an embodiment, the activation signal is: a physical layer signal or a MAC CE.

This example provides a resource reconfiguration method, which enables multiple terminals to perform a resource switching action at the same time, to avoid resource waste or resource confliction.

The UE stores two sets of resource configurations, one set is for the configuration of the activated resource and the other set is for the configuration of the resource to be activated, and the UE only uses the configuration of the activated resource to send and receive data.

The resource parameter contained in the resource configuration includes at least one of:

a period or a frequency; and necessary information indicating a resource location, such as a duration, necessary information for transmitting data, such as a modulation encoding mode and a transmission power, and a resource identifier.

The control node sends a message 1 carrying the configuration of the resource to be activated to the terminal.

The message 1 can be a MAC control frame or an RRC message.

After receiving the message 1, the terminal stores the configuration of the resource to be activated and continues to use the configuration of the activated resource to send and receive data.

The control node sends a signal 2 carrying a resource identifier.

The signal 2 can be a physical layer signal or a MAC CE.

Upon reception of the signal 2, the terminal compares the resource identifier carried by the signal 2 with the identifier in the configuration of the resource to Be activated, and if the resource identifier carried by the signal 2 matches the identifier in the configuration of the resource to be activated, the configuration of the activated resource is discarded and the configuration of the resource to be activated is set as the configuration of the activated resource simultaneously. The switching of the activated resource within the terminal is achieved by activating one resource and deactivating the other resource. With the activation signal, the terminal may activate one resource and deactivate the other resource simultaneously at a time, which can reduce the resource confliction or resource waste caused by unsynchronized activation and deactivation of resources in the related art.

The embodiments of the disclosure provide a communication device including a processor, a transceiver, a memory, and executable programs stored on the memory and executable by the processor. When the executable programs are executed by the processor, the activated resource switching method applied in the UE or the activated resource switching method applied in the control node is implemented.

The communication device may be the above control node or the UE.

The processor may include various types of storage medium. The storage medium is a non-transitory computer storage medium, which is capable of continuing to store the information on the communication device after the communication device is powered down. The communication device includes a control node or a UE.

The processor may be connected to the memory via a bus for reading the executable programs stored on the memory, e.g., at least one of the methods as shown in FIGS. 2 to 5.

The embodiments of the disclosure provide a computer storage medium storing executable programs. When the executable programs are executed by a processor, the method of the first aspect or the method of the second aspect is implemented, for example, at least one of the methods shown in FIGS. 2 to 5.

Figures 8, 9:
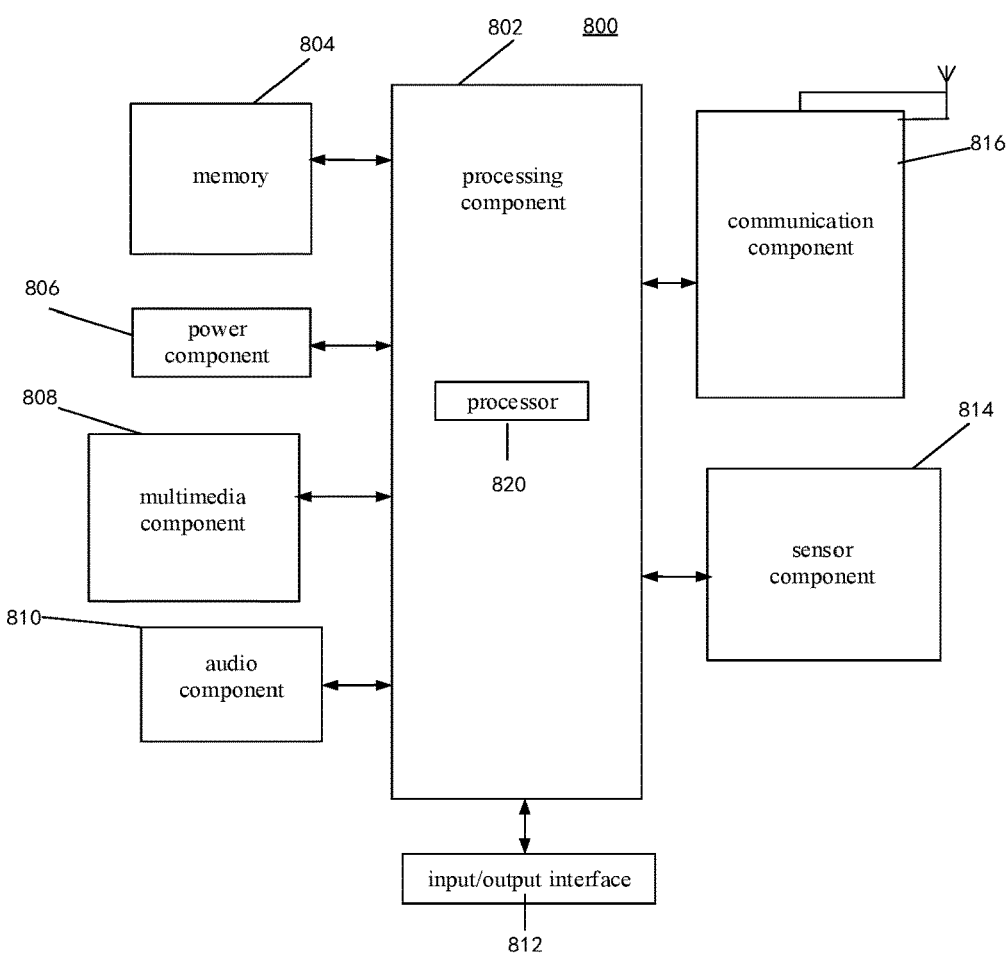
FIG. 8 is a schematic diagram of a UE according to an exemplary embodiment.
FIG. 9 is a schematic diagram of a control node according to an exemplary embodiment.

FIG. 8 is a block diagram of a UE 800 according to an exemplary embodiment. For example, the UE 800 may be a mobile phone, a computer, a digital broadcasting UE, a message transceiver device, a game console, a tablet device, a medical device, a fitness device and a personal digital assistant.

As illustrated in FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 806 provides power to various components of the UE 800. The power component 806 may include a power management system, one or more power source, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In exemplary embodiments, the UE 800 may be implemented with one or more Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described method.

In exemplary embodiments, there is also provided a non-transitory computer readable storage medium including executable instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

FIG. 9 illustrates a structure of a control node 900 according to an embodiment of the disclosure. For example, the control node 900 may be provided as a network side device. As illustrated in FIG. 9, the control node 900 includes a processing component 922, which includes one or more processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform any of the method described above and previously applied to the control node, for example, the method shown in FIGS. 2-3.

The control node 900 may also include a power component 926 configured to perform power management of the control node 900, a wired or wireless network interface 950 configured to connect the control node 900 to the network, and an I/O interface 958. The control node 900 may operate based on an operating system stored on the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An activated resource switching method, performed by a User Equipment (UE), comprising:

receiving an activation signal carrying a (i) resource identifier and (ii) activation time information used to indicate a time at which the UE activates a first resource; and in response to the resource identifier indicating a resource to be activated for the UE, activating the first resource based on a configuration of the resource to be activated containing the resource identifier, and deactivating an activated second resource;

wherein prior to receiving the activation signal, the method further comprises: receiving the configuration of the resource to be activated;

wherein activating the first resource comprises:

setting an identifier for indicating the first resource as a currently activated resource; or, storing the configuration of the first resource in a storage area where the configuration of the activated resource is stored;

wherein deactivating the activated second resource comprises at least one of:

deleting a configuration of the activated second resource;

configuring a discard identifier for the configuration of the activated second resource of the second resource; or removing the configuration of the activated second resource from the storage area where the configuration of the activated resource is stored.

2. The method of claim 1, wherein receiving the configuration of the resource to be activated comprises:

receiving a Media Access Control MAC control frame carrying the configuration of the resource to be activated;

or, receiving a Radio Resource Control RRC message carrying the configuration of the resource to be activated.

3. The method of claim 1, wherein the activation signal is: a physical layer signal or a MAC Control Element CE.

4. The method of claim 1, wherein the configuration of the resource to be activated further comprises:

a resource parameter.

5. The method of claim 4, wherein the resource parameter comprises at least one of:

a resource location parameter, configured to indicate a resource location of a wireless resource;

a modulation encoding parameter, configured to indicate a modulation encoding mode for transmitting data using the wireless resource; and a power parameter, configured to indicate a transmission power for transmitting data using the wireless resource.

6. An activated resource switching method, performed by a control node, comprising:

sending an activation signal carrying (i) a resource identifier and (ii) activation time information used to indicate a time at which a User Equipment (UE) activates a first resource and the activation signal is configured to perform activating of the first resource corresponding to the resource identifier within the UE and to perform deactivating of an activated second resource within the UE;

wherein prior to sending the activation signal, the method further comprises: sending a configuration of a resource to be activated;

wherein activating the first resource comprises:

setting an identifier for indicating the first resource as a currently activated resource; or, storing the configuration of the first resource in a storage area where the configuration of the activated resource is stored;

wherein deactivating the activated second resource comprises at least one of:

deleting a configuration of the activated second resource;

configuring a discard identifier for the configuration of the activated resource of the second resource; or removing the configuration of the activated second resource from the storage area where the configuration of the activated resource is stored.

7. The method of claim 6, wherein sending the configuration of the resource to be activated comprises:

sending a MAC control frame carrying the configuration of the resource to be activated;

or, sending a RRC message carrying the configuration of the resource to be activated.

8. The method of claim 6, wherein the activation signal is: a physical layer signal or a MAC CE.

9. A communication device comprising:

a processor;

a transceiver;

a memory; and executable programs stored on the memory and executable by the processor, wherein the processor is configured to execute the executable programs to:

receive an activation signal carrying (i) a resource identifier and (ii) activation time information used to indicate a time at which a User Equipment (UE) activates a first resource; and in response to the resource identifier indicating a resource to be activated for the UE, perform activating of the first resource based on a configuration of the resource to be activated containing the resource identifier, and perform deactivating of an activated second resource;

wherein the processor is configured to execute the executable programs to, prior to receiving the activation signal, receive the configuration of the resource to be activated;

wherein activating the first resource comprises:

setting an identifier for indicating the first resource as a currently activated resource; or, storing the configuration of the first resource in a storage area where the configuration of the activated resource is stored;

wherein deactivating the activated second resource comprises at least one of:

deleting a configuration of the activated second resource;

configuring a discard identifier for the configuration of the activated second resource of the second resource; or removing the configuration of the activated second resource from the storage area where the configuration of the activated resource is stored.

10. A non-transitory computer storage medium storing executable programs, wherein when the executable programs are executed by a processor, the method of claim 1 is implemented.

11. The communication device of claim 9, wherein the processor is configured to execute the executable programs to:

receive a Media Access Control MAC control frame carrying the configuration of the resource to be activated;

or, receive a Radio Resource Control RRC message carrying the configuration of the resource to be activated.

12. The communication device of claim 9, wherein the activation signal is: a physical layer signal or a MAC Control Element CE.

13. The communication device of claim 9, wherein the configuration of the resource to be activated further comprises:

a resource parameter.

14. The communication device of claim 13, wherein the resource parameter comprises at least one of:

a resource location parameter, configured to indicate a resource location of a wireless resource;

a modulation encoding parameter, configured to indicate a modulation encoding mode for transmitting data using the wireless resource; and a power parameter, configured to indicate a transmission power for transmitting data using the wireless resource.

15. A communication device comprising:

a processor;

a transceiver;

a memory; and executable programs stored on the memory and executable by the processor, wherein the processor is configured to execute the executable programs to perform the method of claim 6.

16. A non-transitory computer storage medium storing executable programs, wherein when the executable programs are executed by a processor, the method of claim 6 is implemented.

* * * * *